United States Patent [19]

Denton, III et al.

[11] Patent Number: 5,843,393
[45] Date of Patent: Dec. 1, 1998

[54] CARBON ELECTRODE MATERIAL FOR ELECTROCHEMICAL CELLS AND METHOD OF MAKING SAME

[75] Inventors: Frank R. Denton, III; Guoping Deng, both of Lawrenceville, Ga.

[73] Assignee: Motorola, Inc., Schaumburg, Ill.

[21] Appl. No.: 901,175

[22] Filed: Jul. 28, 1997

[51] Int. Cl.⁶ ...................................................... D01F 9/12
[52] U.S. Cl. ................................. 423/447.4; 423/245.1; 423/245.3; 423/210; 423/447.2; 423/447.7; 423/447.8; 423/447.9; 429/218; 427/113
[58] Field of Search ............................. 423/245.1, 245.3, 423/210, 447.2, 447.4, 447.7, 447.8, 447.9; 429/218; 427/113

[56] References Cited

U.S. PATENT DOCUMENTS

| | | | |
|---|---|---|---|
| Re. 33,306 | 8/1990 | Hayashi et al. ........................ | 429/194 |
| 3,615,829 | 10/1971 | Sprague ...................................... | 136/6 |
| 4,040,990 | 8/1977 | Neely ................................... | 260/2.1 R |
| 4,615,959 | 10/1986 | Hayashi et al. ......................... | 429/218 |
| 4,666,736 | 5/1987 | Matsumura et al. ..................... | 427/113 |
| 4,808,475 | 2/1989 | Matsumura et al. .................. | 423/447.1 |
| 4,980,037 | 12/1990 | Hossain ................................... | 204/130 |
| 5,403,798 | 4/1995 | Brendley, Jr. et al. ............... | 423/245.3 |
| 5,416,056 | 5/1995 | Baker ....................................... | 502/425 |
| 5,451,477 | 9/1995 | Omaru ..................................... | 429/218 |

*Primary Examiner*—Bruce F. Bell
*Attorney, Agent, or Firm*—Felipe J. Farley

[57] ABSTRACT

A method (50) of fabricating an amorphous carbon material for use as an electrode (20) in a rechargeable electrochemical cell (10) includes the steps of heating (62) a lignin material until it has fully cured, comminuting (68) the lignin material before it has carbonized, and subsequently heating (70) the lignin material until it has carbonized.

20 Claims, 4 Drawing Sheets

5,843,393

CARBON ELECTRODE MATERIAL FOR ELECTROCHEMICAL CELLS AND METHOD OF MAKING SAME

TECHNICAL FIELD

This invention relates in general to the field of electrodes and electrode materials for electrochemical cells, and in particular to methods of synthesizing said electrodes and electrode materials.

BACKGROUND OF THE INVENTION

As electronic devices increasingly become portable, advances must be made in energy storage systems to enable such portability. Indeed, it is often the case with current electronic technology that the limiting factor to portability of a given device is the size and the weight of the associated energy storage device. A small energy storage device, such as a battery, may be fabricated for a given electrical device but at the cost of energy capacity. Conversely, a long lasting energy source can be built but it is often too large or too bulky to be comfortably portable. The result is that the energy source is either too heavy or does not last long enough for a particular user's application.

Numerous different battery systems have been proposed for use over the years. Early rechargeable battery systems included lead acid and nickel cadmium (NiCad), each of which have enjoyed considerable success in the market place. Lead acid batteries are preferred for applications in which ruggedness and durability are required and hence have been the choice of automotive and heavy industrial settings. Conversely, NiCad batteries have been preferred for smaller portable applications. More recently, nickel metal hydride systems (NiMH) have found increasing acceptance for both large and small applications.

Notwithstanding the success of the foregoing battery systems, other new batteries are appearing on the horizon which offer the promise of better capacity, better power density, longer cycle life, and lower weight, as compared with the current state of the art. The first such system to reach the market is the lithium ion battery which is already finding its way into numerous consumer products. Lithium polymer batteries are also receiving considerable attention, although they have not yet reached the market.

Lithium batteries in general include a positive electrode fabricated of, for example, a transition metal oxide material and a negative electrode fabricated of an activated carbon material such as graphite or petroleum coke. New materials for both electrodes have been investigated intensely because of the high potential for improved energy density. To date, however, most of the attention has been focused on the transition metal oxide electrode.

Activated carbon electrode materials are routinely prepared by using difunctional monomers as polymer precursors. Examples of such precursors include resins of furfural alcohol, phenyl, formaldehyde, acetone, furfuryl or furfuryl alcohol-phenyl copolymers. Other precursors include polyacrylonitrile, and rayon polymers, as disclosed in Jenkins, et al, *Polymeric Carbons-Carbon Fiber, Glass and Char*, Cambridge University Press, Cambridge, England, (1976). Materials which result from these processes are typically characterized by relatively low yields as well as high cost and low capacity.

More recently, multi-functional organic monomers and highly aromatic polyesters with aliphatic spacers have produced excellent carbons for use in lithium rechargeable electrochemical cells. Specifically, such materials are disclosed in, for example, U.S. patent application Ser. No. 08/534,427, filed Sep. 27, 1995 now U.S. Pat. No. 5,589,289 in the name of Zhang, et al, and assigned to Motorola, Inc., and 08/561,641 filed Nov. 22, 1995 now U.S. Pat. No. 5,635,151 in the name of Zhang, et al and assigned to Motorola, Inc., the disclosures of which are incorporated herein by reference.

While the materials disclosed in the foregoing U.S. patent applications have demonstrated excellent characteristics for purposes of electrochemical cells, they are the result of synthetic processing and therefore are not easily renewable. Moreover, those materials have less than ideal yield and less than optimal molecular weight.

Accordingly, there exists a need for improved carbon materials for use in electrochemical cell applications. The improved carbon materials should be fabricated from relatively inexpensive, readily available and renewable precursor materials. The precursor materials should also have a relatively high char-yield so as to yield an amorphous carbon material with the most desirable characteristics.

DETAILED DESCRIPTION OF THE PREFERRED EMBODIMENT

Figure 1:
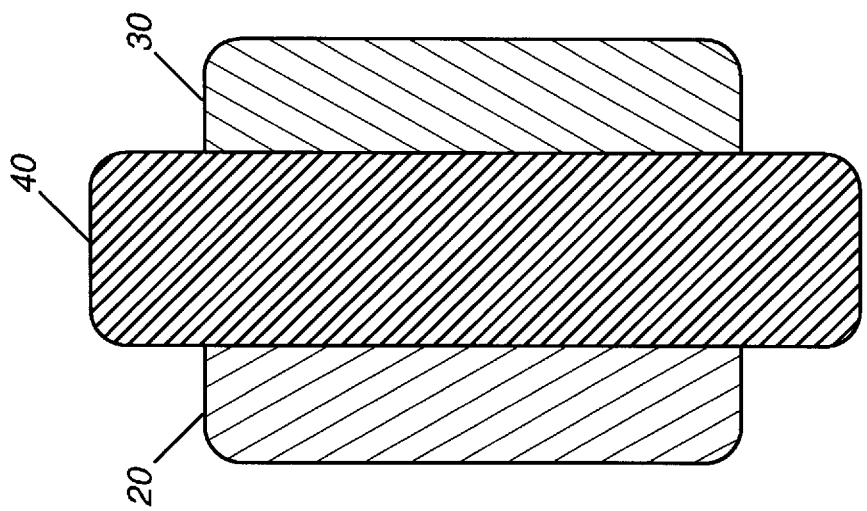
FIG. 1 is a schematic representation of an electrochemical cell including an electrode fabricated of a carbon material in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of a rechargeable electrochemical cell 10, such as a battery or an electrochemical capacitor, that includes a carbon electrode material fabricated in accordance with the instant invention. The electrochemical cell 10 includes a positive electrode or cathode 20, a negative electrode or anode 30, and an electrolyte 40 disposed therebetween. The cell negative electrode 30 is fabricated of an amorphous carbon material such as that described in greater detail hereinbelow. The positive electrode 20 of the cell 10 may be fabricated from a lithiated transition metal oxide such as is well known in the art. Alternatively, the positive electrode material may be fabricated of a material such as that described in commonly assigned, copending patent application Ser. No. 08/464,440, filed Jun. 5, 1995 now U.S. Pat. No. 5,591,548 in the name of Mao, et al and entitled "POSITIVE ELECTRODE MATERIALS FOR RECHARGEABLE ELECTROCHEMICAL CELLS AND METHOD OF MAKING SAME", the disclosure of which is incorporated herein by reference.

The electrolyte 40 disposed between the electrodes may be any of the electrolytes known in the art including, for example, LiClO$_4$ in propylene carbonate or a polyethylene oxide impregnated with a lithiated salt. The electrolyte 40 may also act as a separator between the positive and negative electrodes. The electrolyte may be aqueous, nonaqueous, solid state, gel, or some combination thereof. Alternatively, the electrolyte material may be fabricated in a manner such as that described in commonly assigned copending patent application Ser. No. 08/518,732 filed Aug. 24, 1995 now U.S. Pat. No. 5,658,685 in the name of Oliver, et al and entitled "BLENDED POLYMER GEL ELECTRODES", the disclosure of which is incorporated herein by reference.

In accordance with the instant invention, there is provided a method for making carbon materials for use as an electrode in an electrochemical cell such as that shown in FIG. 1. The carbon materials are substantially amorphous, although it will be appreciated that they could be partially or completely crystalline or amorphous but possessing crystalline inclusions. They may further include an amount of one or more modifier materials. The exact nature of the modifiers is dependent upon the specific application contemplated.

Instead of the multi-functional or difunctional monomers or chars known in the prior art, the instant invention uses lignin as a starting material. Lignin is the by-product of paper and pulp industry, and, as will be described in greater detail hereinbelow, can yield an amorphous carbon material with capacities in excess of 500 milliampere hours per gram (mAh/g) and a yield in excess of 50%. Since lignin is generated at a rate of over 50 million metric tons a year, using lignin as a starting material to make an amorphous carbon electrode for rechargeable electrochemical cells provides a tremendous economic advantage. Moreover, lignin is a renewable source; its existence in the biosphere is estimated to be $3 \times 10^{11}$ metric tons with an annual biosynthetic rate of $2 \times 10^{10}$ tons per year.

There are several types of lignin defined by relatively small variations in the chemical structure. The chief distinctions between lignins are: hard wood lignin versus soft wood lignin; the type of chemical pulping used to remove the lignin from raw wood; and subsequent chemical modifications. The type of lignin described for use herein is a byproduct of relatively soft wood, specifically Southern Yellow Pine. The chemical pulping process used to isolate the lignin is known as the "Kraft process". The Kraft process uses aqueous mixtures of sodium sulfide and sodium hydroxide to separate the cellulosic fibers from the lignin material. The degree of oxidation and/or degradation of the obtained lignins varies with the choice of the pulping process. Indeed, lignin exhibits slow, spontaneous oxidation and degradation even upon prolonged exposure to air. However, lignin products from the various pulping methods are substantially similar for purposes of the pyrolysis process described herein.

Other common pulping processing include the "green liquor" process that is usually used for the so-called hardwoods and that comprises treatment of the product with aqueous sodium carbonate and sodium sulfide; the acid sulfite process employing an aqueous sulfite salt of calcium, magnesium, sodium, or ammonium; mechanical and thermal mechanical pulping; and organo-solv pulping wherein an organic solvent is substituted for some or all of the water used in the aqueous methods.

The lignin used herein is subjected to a subsequent modification. Specifically, following the pulping process, the liquor comprising the aqueous lignin dispersion is spray-dried to obtain a powder, as is common in the industry. The resulting lignin has a molecular weight of approximately 1000 to 2000.

The lignins described herein include 3 cinnamyl alcohols. These alcohols are the monomeric precursors of the lignin and include p-coumaryl alcohol, coniferyl alcohol and sinapyl alcohol. The structural units of each of the three cinnamyl alcohols have oxyphenyl propyloxy skeletons, and differ from each other only in the number of methoxyl groups attached to the benzene ring. In the polymeric structure of lignin, these structural units are held together by a variety of ether and carbon/carbon bonds.

The biogenesis of lignins proceeds through the Shikimic acid pathway; thus, the same or similar hydroxyphenyl propenyl intermediates found in lignin are also present in other products which are the result of that acid pathway. Examples of such materials include flavanoids, suberin, betalains, coumarins, sporopollenins, and certain amino acids such as tyrosine, tryptophan and phenylalanine. Further, the oxyphenylpropyl backbone units characteristic of the cinnamyl alcohols described hereinabove can also be found in the first stages of decomposition of most carbon based botanical matter. Specifically, the humic substances such as humic acid, fulvic acid, and humin as well as cerogens may be useful. In addition, chemical degradation products of lignin, such as hibberts ketones, also have this useful structure. Accordingly, while the preferred material described herein is the result of pyrolysis of lignin, it is to be understood that the invention is not so limited. Rather, the invention disclosed herein relates to amorphous carbonaceous materials which are the result of pyrolysis of products of the Shikimic acid pathway and, in particular, substances possessing an oxyphenyl propyloxy backbone unit.

Figure 2:
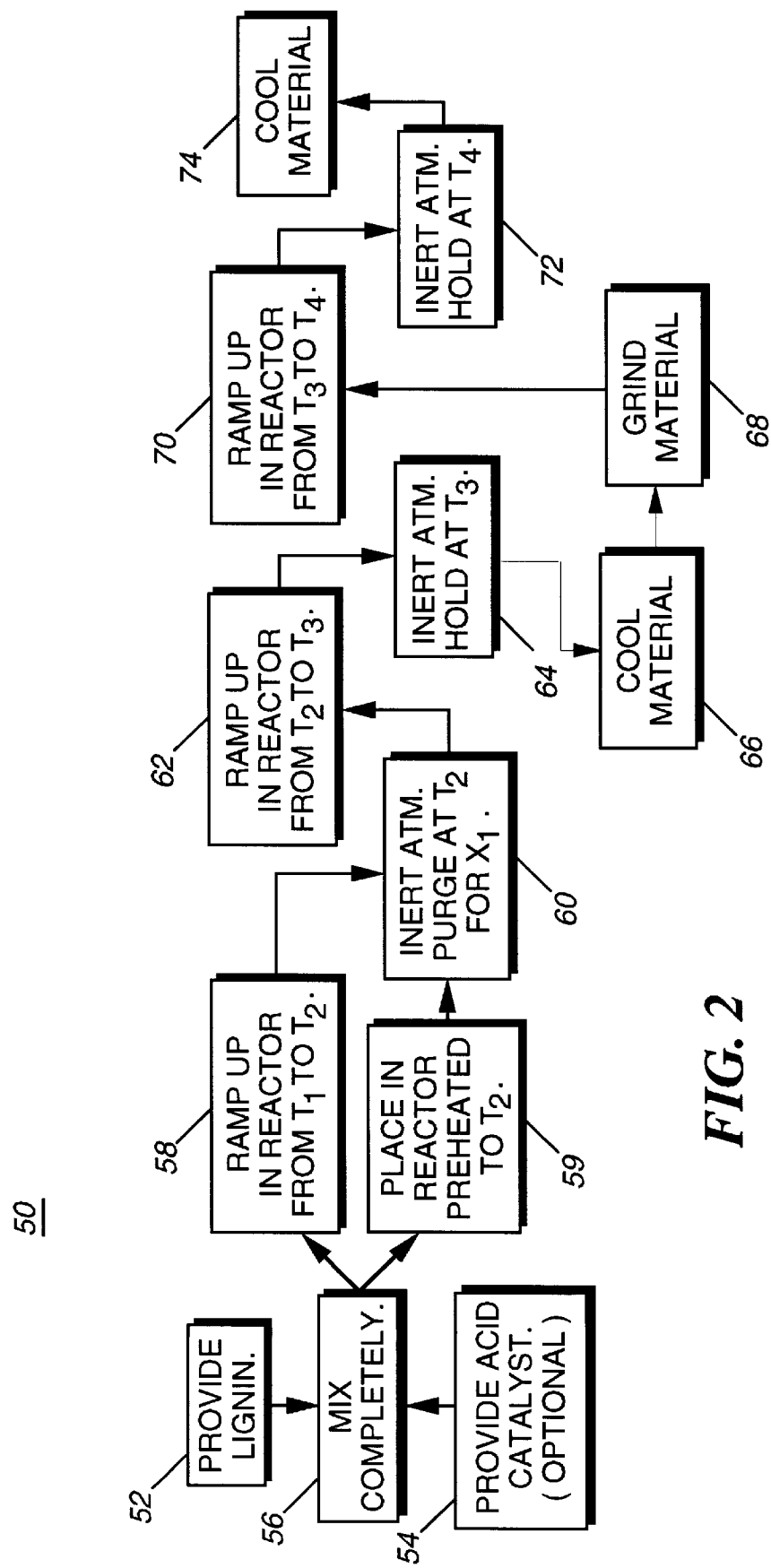
FIG. 2 is a flowchart illustrating the steps for preparing a carbon material in accordance with the instant invention.

Referring now to FIG. 2, there is illustrated therein a flowchart of steps for fabricating an amorphous carbon material in accordance with the instant invention. It will be appreciated that temperatures and ramp rates used to form the amorphous carbon material will vary with the furnace size and volume. Specifically, the temperatures and ramp rates described below are appropriate when using a three-inch ceramic tube furnace having an inner diamer of approximately 6.75 centimeters and an outer diameter of approximately 7.62 centimeters. The flowchart 50, at Box 52, illustrates the first step of the fabrication process and specifically the step of providing the lignin material. The lignin material provided at Box 52 is similar to that described hereinabove or, alternatively, can be any other of the other materials described herein.

Illustrated at Box 54 is the optional step of mixing the lignin material with an acid catalyst. It has been found that, when the lignin material is heated in the presence of an acid catalyst, the reaction of the lignin is more complete and results in an improved yield of the final product. Consequently, the carbon material may be formed with an acid present, although this is not necessary. Examples of acids preferred include acids selected from the group consisting of acetic acid, boric acid, phosphoric acid, p-toluene sulfonic acid, 4-amino benzoic acid, trifluoroacetic acid and combinations thereof. The acid, when used, may be present in amounts between 1 and 25 wt %.

Thereafter, as is illustrated in Box 56, the acid catalyst, when present, and the lignin material are thoroughly mixed, such as by a blender, a ball mill, or a jar mill. Once thoroughly mixed, the lignin/acid mixture is ready for the pyrolysis or carbonization process. It will be appreciated that the mixing step of Box 56 need not be performed when it is not desired to mix an acid with the lignin material.

The heating temperatures used in the pyrolysis/carbonization process can be determined by Thermogravimetric analysis (TGA) and differential scanning calorimetry (DSC), which have generally indicated that the pyrolysis/carbonization process should be a two-temperature one-step heating process. The mixture of lignin and acid catalyst is placed in a furnace or reactor which is held at temperature $T_1$ or essentially room temperature. Thereafter, the furnace is ramped from room temperature up to a temperature $T_2$ which is generally between 100° and 150° C., and preferably about 120° C. Alternatively, the base temperature of the furnace can be 120° C. so that the temperature need not be ramped up from room temperature. This step is illustrated at Box 58 of the flowchart. Alternatively, as is illustrated in Box 59, the reactor may be preheated to temperature $T_2$. After placing the mixture of lignin and acid in the oven, and reaching temperature level $T_2$, the atmosphere inside the reactor is purged with an inert gas so as to yield an inert atmosphere as illustrated by Box 60. Examples of an inert atmosphere used in connection herewith include argon, nitrogen, $CO_2$, and helium. In a preferred embodiment, the inert atmosphere is argon.

After flooding the reactor in an inert atmosphere, the temperature inside the reactor is ramped up from the $T_2$ level to a $T_3$ level. The $T_3$ temperature is typically the temperature at which the lignin, or the lignin mixture, is fully cured, such as between about 300° C. and 400° C. Preferably, the $T_3$ temperature is approximately 350° C. The rate at which the temperature is ramped from $T_2$ level to the $T_3$ level is typically between 0.1° and 5° C. per minute and preferably 0.5° C. per minute. This step is illustrated in Box 62 of the flowchart. The mixture is held at the $T_3$ temperature for a period of time of between three and twelve hours, preferably approximately six hours. This step is illustrated at Box 64 of the flowchart.

Thereafter, at Box 66, the lignin, or the lignin mixture, is cooled to room temperature, such as by turning off the furnace or reactor in which the mixture has been heated. Alternatively, the lignin or lignin mixture can be removed from the furnace so that it will have cooled sufficiently by the time processing at the next step has commenced. Next, the lignin or lignin mixture is comminuted, at Box 68. In accordance with the present invention, after this first heating step, the material is comminuted to a particle size of approximately less than 100 microns, preferably between 5 and 50 microns. Comminution may be carried out via conventional grinding techniques that are well known to those of ordinary skill in the art and need not be done in an inert atmosphere. For example, the material can be ground by jet milling, hammer milling, ball milling, etc.

Referring now to Box 70, the comminuted material is returned to the furnace or reactor, and the temperature in the oven is ramped up to the $T_4$ temperature level. The $T_4$ temperature level is preferably between approximately 800° C. and 1200° C. and most preferably about 1000°–1020° C. The temperature is ramped up to the $T_4$ level at a rate of approximately 1°–5° C. per minute and preferably 2.5° C. per minute. Thereafter, as is illustrated in Box 72, the comminuted mixture is held at the $T_4$ level in an inert atmosphere for a period of time of between 0.5 and 5 hours and preferably about 1 hour. Thereafter, as shown in Box 74, the reactor or furnace is turned off and the mixture is again allowed to cool to room temperature. Cooling typically occurs in 4–6 hours time.

The pyrolysis/carbonization process described hereinabove with respect to FIG. 2 is a two-temperature process in which the lignin, or the lignin and acid mixture, is heated at a relatively low temperature which results in the condensation of the lignin material to drive off water vapor and other undesired aliphatics. As noted above, the lignin material is characterized by relatively high char yield, resulting in less aliphatic materials to be driven off as well as less boil off and more rapid aromatization. Thereafter, the lignin is comminuted after it has fully cured, i.e., after it no longer flows at high temperatures. Upon further heating as at the $T_4$ level, the condensed, comminuted lignin product decomposes and forms carbon. It is hypothesized that a variety of carbon-carbon bonds and ether bonds between the phenyl rings in the lignin precursor materials are formed. As noted above, the lignin material is phenolic, resulting in high reactivity in cross bonding of the phenyl rings.

In prior art processes for forming carbon, the precursor material is heated until carbon has been produced in the form of a hard block of carbon that is then ground, such as by jet milling. This block of carbon is relatively difficult to grind, resulting in greater expense, greater grinding times, and more worn machinery parts. The process according to the present invention, on the other hand, incorporates a "pre-grinding" step in which the carbon precursor material is comminuted after it has fully cured but before it has been fully carbonized. As a result, the material that is ground is softer and easier to grind. Furthermore, if the material has been comminuted to form the desired particle sizes, no further grinding is necessary after carbonization, so the process according to the present invention requires no further process steps. In other words, after the second heating step, the previously comminuted carbon can be used to form an electrode for an electrochemical cell without any further comminuting steps.

The material resulting from the process illustrated in FIG. 2 may also be subjected to a secondary treatment. For instance, when the particle size of the resulting amorphous carbon material still needs to be smaller, the previously ground amorphous carbon material can be further comminuted to a smaller particle size. As mentioned above, the particle size of the carbon material is preferably between 5 and 50 microns. Another optional secondary treatment comprises mixing the comminuted amorphous carbon material with a lithium containing component or lithium salt consisting of $LiNO_3$, $Li_3PO_4$, $LiOH$, $Li_2SO_4$, $Li_2CO_3$, lithium acetate, and combinations thereof. One preferred lithium containing compound with which the comminuted amorphous carbon material can be mixed is $LiNO_3$. Thereafter, the mixture of the comminuted amorphous carbon material and the lithium containing compound can be subjected to a heat treatment process. This heat treatment process comprises heating the mixture at temperatures between 500° C. and 1200° C. and preferably between 600° C. and 800° C. The period of time for this heat treatment is approximately between 8 and 20 hours, with 12 hours being preferred.

The material resulting from the process illustrated hereinabove with respect to FIG. 2 is a substantially amorphous material which is characterized by a d-spacing of the (002) peak of between 3.8 angstroms and 4.2 angstroms. The true density of this material is on the order of approximately <1.6 g/cm³ up to approximately 2.2 g/cm³. The capacity of the material disclosed herein is typically in excess of approximately 480 mAh/g and is typically greater than 500 mAh/g.

The instant invention may be understood by the examples provided below.

Figure 3:
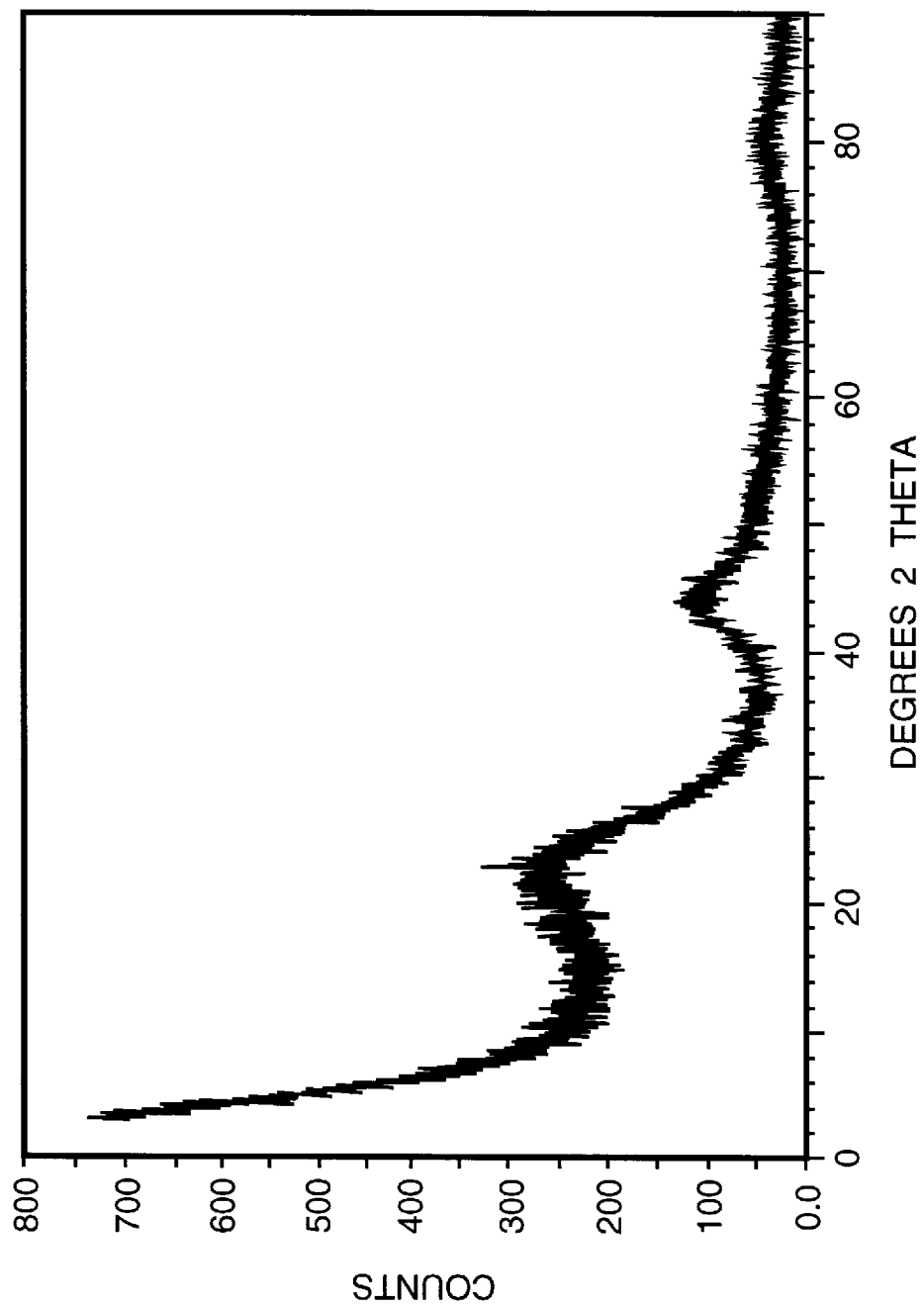
FIG. 3 is an x-ray diffraction analysis for a carbon material fabricated in accordance with the instant invention.
Figure 4:
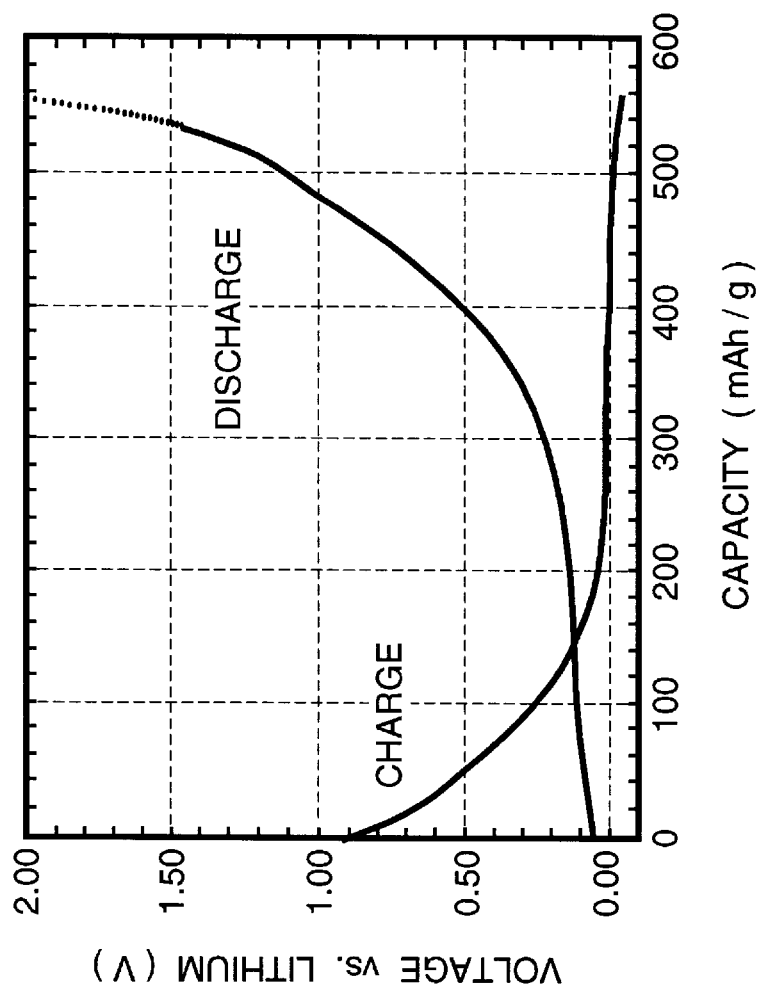
FIG. 4 is an illustration of charge and discharge curves for an electrochemical cell including an electrode fabricated of a carbon material in accordance with the instant invention.

EXAMPLE I 4.0 g of a lignin material synthesized by the Kraft process was purchased from Westvaco Corp. and is known as Indulin AT. The lignin material was placed in a ceramic crucible and pyrolyzed in a one-inch quartz tube furnace having a tube diameter of approximately 2.54 centimeters. This pyrolysis occurred under an argon atmosphere by ramping the temperature from room temperature to 350° C. at 2° C. per minute. The material was held at 350° C. for six hours. The material was then cooled to room temperature and comminuted to an average particle size of approximately 45 microns. The comminuted material was returned to the tube furnace, heated from room temperature to 1030° C. at 10° C. per minute, and held at 1030° C. for 1 hour. The carbonized, previously comminuted material was then cooled to room temperature. 1.9 g of ground, amorphous carbon material was collected following this process. X-ray diffraction analysis of the carbon material resulting from this Example I is illustrated in FIG. 3 and indicates that the d-spacing of the (002) peak centered at approximately 4.03 angstroms. The reversible lithium intercalation capacity of the material is illustrated in FIG. 4 and demonstrates that the material capacity is approximately 520 mAh/g.

EXAMPLE II 4.0 g of a lignin material synthesized by the Kraft process was placed in a ceramic crucible and pyrolyzed in a one-inch tube furnace under an argon atmosphere by ramping the temperature from room temperature to 350° C. at 2° C. per minute then from 350° C. to 1030° C. at 10° C. per minute. The temperature was held at 1030° C. for 1 hour. The carbonized material was cooled to room temperature and comminuted to an average particle size of approximately 45 microns. The material capacity of the amorphous carbon material was approximately 465 mAh/g.

In summary, the carbon heating a precursor m above is produced by heating a precursor material, such as lignin, in a first heating step until the precursor material is fully cured, after which the material is cooled and comminuted to a desired particle size. Thereafter, the ground material is heated to a second, higher temperature to carbonize the material, resulting in a comminuted, amorphous carbon material that need not be ground further. This carbon material has a capacity that is greater than that of carbon material that has not undergone grinding before carbonization.

Furthermore, the intermediate grinding step in accordance with the present invention occurs before the precursor material has completely hardened. As a result, grinding is easier, faster, and less destructive to grinding machinery. A further advantage is that the second heating step can be performed more rapidly than in other processes since gas can be removed more easily from the ground material than from an unground material.

It will be appreciated by now that there has been provided a more efficient method for manufacturing a carbon material that has improved performance when used for an electrode in an electrochemical cell.

What is claimed is:

1. A method of fabricating an amorphous carbon material for use as an electrode in a rechargeable electrochemical cell, said method comprising the steps of:
   heating, in a first heating step, a lignin material until it has fully cured;
   comminuting the lignin material before it has carbonized; and
   heating, in a second heating step subsequent to the comminuting step, the lignin material until it has carbonized.

2. The method of claim 1, wherein said first heating step comprises the step of heating the lignin material to temperature between 300° C. and 400° C.

3. The method of claim 1, wherein the second heating step comprises the step of heating the lignin material to a temperature between 800° C. and 1200° C.

4. The method of claim 1, further including the step of mixing the lignin material with an acid prior to the first heating step.

5. The method of claim 1, wherein the comminuting step comprises the step of grinding the lignin material to an average particle size of less than 100 microns.

6. The method of claim 1, wherein the first and second heating steps comprise heating the lignin material in an inert atmosphere.

7. The method of claim 6, wherein the inert atmosphere is selected from the group of Ar, $N_2$, He, $CO_2$, and combinations thereof.

8. A method of fabricating an amorphous carbon material for use as an electrode in a rechargeable electrochemical cell, said method comprising the steps of:
   heating, in a first heating step, a lignin material until it has fully cured;
   comminuting the lignin material before it has carbonized;
   heating, in a second heating step subsequent to the comminuting step, the lignin material until it has carbonized to produce the amorphous carbon material; and
   using the amorphous carbon material to form the electrode without comminuting the amorphous carbon material after the second heating step.

9. An amorphous carbon material for use as an electrode in a rechargeable electrochemical cell, the amorphous carbon material fabricated by a method comprising the steps of:
   heating, in a first heating step, a lignin material until it has fully cured;
   comminuting the lignin material before it has carbonized; and
   heating, in a second heating step subsequent to the comminuting step, the lignin material until it has carbonized.

10. The amorphous carbon material of claim 9, characterized by a capacity of greater than 500 mAh/g.

11. The amorphous carbon material of claim 9, wherein the first heating step comprises the step of heating the lignin material to temperature between 300° C. and 400° C.

12. The amorphous carbon material of claim 9, wherein the second heating step comprises the step of heating the lignin material to a temperature between 800° C. and 1200° C.

13. The amorphous carbon material of claim 9, further including the step of mixing the lignin material with an acid prior to the first heating step.

14. The amorphous carbon material of claim 9, wherein the comminuting step comprises the step of grinding the lignin material to an average particle size of less than 100 microns.

15. The amorphous carbon material of claim 9, wherein the first and second heating steps comprise heating the lignin material in an inert atmosphere.

16. The amorphous carbon material of claim 15, wherein the inert atmosphere is selected from the group of Ar, $N_2$, He, $CO_2$, and combinations thereof.

17. An electrode for a rechargeable electrochemical cell, the electrode comprising an amorphous carbon material fabricated using a method comprising the steps of:
   heating, in a first heating step, a lignin material until it has fully cured;
   comminuting the lignin material before it has carbonized; and
   heating, in a second heating step subsequent to the comminuting step, the lignin material until it has carbonized into the amorphous carbon material.

18. The electrode of claim 17, wherein the amorphous carbon material is characterized by a capacity of greater than 500 mAh/g.

19. The electrode of claim 17, wherein:
   the first heating step comprises the step of heating the lignin material to temperature between 300° C. and 400° C.; and
   the second heating step comprises the step of heating the lignin material to a temperature between 800° C. and 1200° C.

20. The electrode of claim 17, wherein the comminuting step comprises the step of grinding the lignin material to an average particle size of less than 100 microns.

* * * * *